Patented June 16, 1936

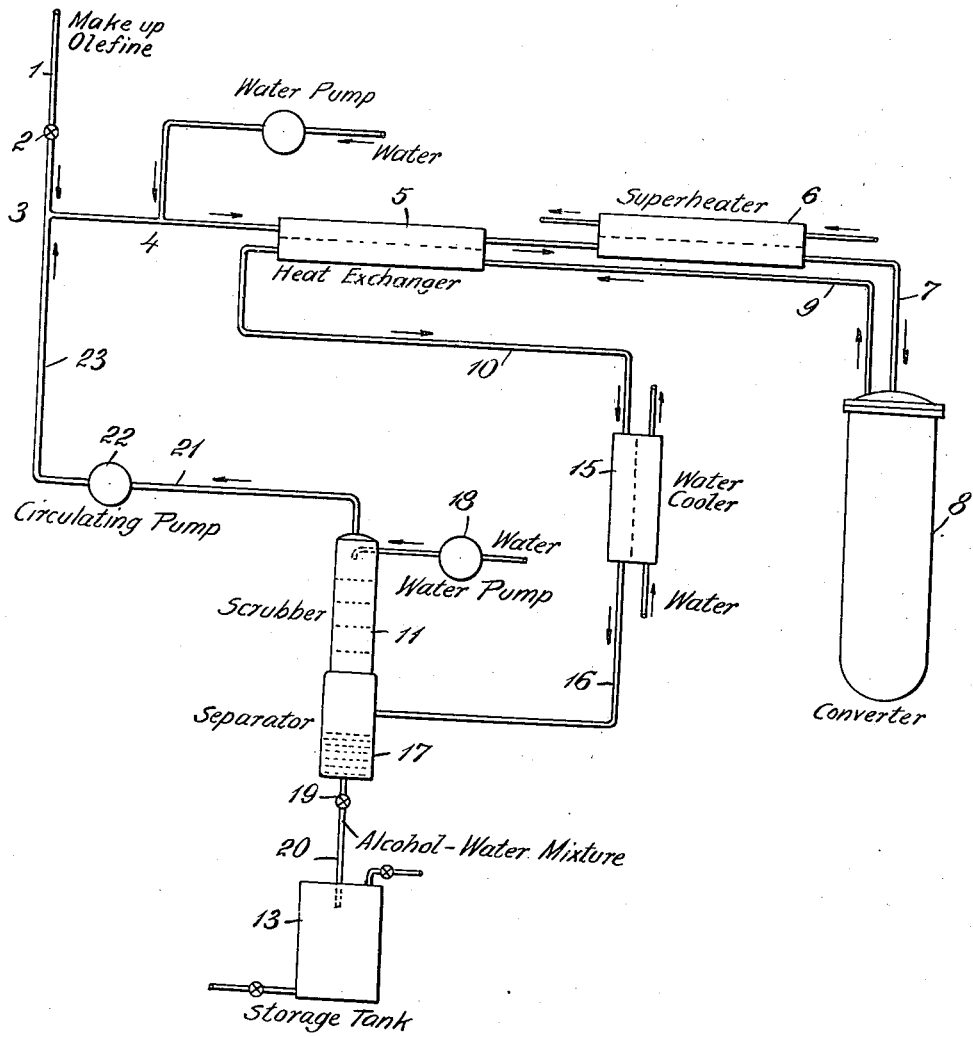

2,044,414

UNITED STATES PATENT OFFICE 2,044,414

MANUFACTURE OF ALCOHOLS

Walter Wilkinson, Rye, N. Y., assignor to Air Reduction Company, Incorporated, New York, N. Y., a corporation of New York Application October 20, 1934, Serial No. 749,149

6 Claims. (Cl. 260—156)

This invention relates to the production of alcohols, such as ethyl and isopropyl alcohols, from alkylene hydrocarbons, such as ethylene and propylene, and more particularly to improvements in the continuous production of such alcohols from such alkylene hydrocarbons, under a high pressure, and with separation of the alcohols from the unconverted alkylene hydrocarbons and recirculation of the hydrocarbons in the further carrying out of the continuous process.

In the continuous production of alcohols, such as ethyl alcohol or isopropyl alcohol, from alkylene hydrocarbons, such as ethylene or propylene, the hydrocarbon is combined with water or steam under the influence of a suitable catalyst, so that there emerges from the converter or catalytic chamber a mixture of unchanged alkylene hydrocarbon, steam and alcohol vapor at a high temperature. The alcohol must be recovered from these admixed gases and vapors before the alkylene hydrocarbon is returned for further use in the continuous carrying out of the process. When this continuous process is carried out under a high pressure, and when the condensation of the alcohol from the hydrocarbon is also carried out under a high pressure, so that the unchanged hydrocarbon can be recycled through the converter under the same high pressure, difficulties are met with in effecting a satisfactory separation of the alcohol from the alkylene hydrocarbon.

As an instance of such a continuous process, as heretofore proposed, may be mentioned the continuous production of ethyl alcohol by passing a mixture of ethylene and steam in contact with a suitable catalyst, such as a dilute sulfuric acid catalyst, maintained at a high temperature and under a high pressure, and with the temperature, pressure, and ratio of steam to ethylene regulated so as to maintain the strength of the dilute acid catalyst substantially constant. In such a process, a mixture of ethylene, steam and ethyl alcohol emerges from the converter in the vapor phase at a high temperature, and is cooled to condense the water and alcohol therefrom under the same high pressure so that the remaining ethylene gas may be reintroduced through the converter again after suitable admixture with steam. With the use of a heat interchanger, the hot gases and vapors are cooled and the water and alcohol partly condensed in the interchanger; and are then further cooled to effect further condensation of alcohol, so as to remove the alcohol as completely as possible from the ethylene before it is recycled to the converter.

I have found that when this condensation of alcohol, from admixed ethylene, takes place under a high pressure, difficulties are encountered in effecting satisfactory condensation and separation of the alcohol, and that similar difficulties are encountered in the condensation and separation of isopropyl alcohol from propylene, when produced in a similar manner.

It would normally be thought that, as the temperature of the mixed vapors and alkylene hydrocarbons was reduced, more and more alcohol could be removed from the vapors until the vapors would finally contain an inappreciable amount, and only pure ethylene or propylene, practically free from alcohol vapors, would be left for return to the process. Such, however, is not the case. When operating at a pressure of, for example, 1000 pounds per square inch gauge, more and more alcohol is condensed from the vapors down to a certain temperature, and thereafter, if the mixture is cooled still further, I have found that instead of condensing more alcohol from the vapor, the vapor will contain more alcohol than at the higher temperature, thus making it impossible commercially to remove all the alcohols from the gas stream by simple condensation. I have found that under such conditions the ethylene escaping from the condenser contains considerable amounts of alcohol which, if not removed, will be returned to the converter, thus interfering with the efficiency of the process.

I have also found that when ordinary condensers and separators are used under a high pressure and at successively lower temperatures, the very high solubility of ethylene in the high proof condensate obtained from separators operated at the lower temperatures results in an appreciable loss of ethylene, which is thus lost to the process, or requires special subsequent handling of the alcohol for its recovery.

I have found that this problem can be solved and the difficulties overcome in a simple and advantageous manner by introducing a stream of pure water in countercurrent with the flow of alcohol vapor and ethylene maintained under a high pressure, and that, thereby, the ethylene can be practically freed from alcohol vapor before its return to the converter while the condensed alcohol, in a diluted state, is withdrawn with a minimum loss of ethylene in solution.

This countercurrent scrubbing of the ethylene and alcohol vapor mixture under a high pressure brings the fresh pure water into contact with ethylene gases from which the alcohol vapor has already been for the most part removed, thus insuring substantially complete removal by condensing or absorbing of the alcohol vapor in the fresh water. At the bottom of the countercurrent scrubber the incoming admixed ethylene and alcohol vapor, with any admixed steam, come into contact with the dilute alcohol which has been formed by the scrubbing and condensing of the alcohol from the admixed vapors in the countercurrent scrubber. As the admixed ethylene and alcohol vapors come into contact with the dilute alcohol at the bottom of the scrubber, and as they pass upwardly through the progressively purer water, with lower alcohol content, the downcoming stream of water causes the alcohol to enter the liquid phase so that the alcohol is removed almost completely from the ethylene and absorbed in the water, and so that the ethylene can escape at the top of the apparatus practically free from alcohol, due to the presence at this location of liquid water which previously contained no alcohol. Similarly the alcohol can be recovered in the form of an alcohol-water mixture, for example, of around 15% alcohol, in which the ethylene is only slightly soluble, even under the high pressures, so that the alcohol can be withdrawn without any objectionable loss of ethylene dissolved therein.

The introduction of pure water destroys the equilibrium existing between the cooled and highly compressed ethylene and the alcohol vapors that would exist if the water were not introduced. This equilibrium is such that a surprisingly large amount of alcohol will pass unseparated in vapor form through the high pressure separator or condenser in equilibrium with the ethylene. When two successive separators or condensers are used in series, with the second at a much lower temperature than the first, the concentration of the alcohol vapors in the ethylene and in equilibrium with the condensed alcohol is sufficient to reduce very materially the further production of alcohol in the converter, if the alcohol vapors are permitted to return to the converter with the ethylene. The introduction of liquid water, and the scrubbing of the high pressure ethylene gas in a countercurrent manner, effects substantially complete removal of this alcohol, thus enabling the alcohol to be readily condensed and removed in a form such that it carries with it less ethylene in solution, while at the same time freeing the ethylene gas to be recycled to the process from its objectionable content of alcohol vapors.

While I have referred to the separation and condensation of ethyl alcohol from admixed ethylene, isopropyl alcohol can be separated from admixed propylene in a similar manner and with similar advantages.

With ethylene, the cooling of the gases and admixed alcohol vapors to a low temperature, such as would be obtained with the use of cold water, leaves the ethylene in gaseous state, and it is in its gaseous state that it is scrubbed by the countercurrent water treatment.

In the case of propylene, however, the cooling of the highly compressed propylene to a low temperature, below the critical temperature, may result in liquefaction of the propylene to a greater or less extent under the high pressure maintained during the cyclic process. Liquid propylene, however, has a density sufficiently less than that of the condensed aqueous alcohol so that there is a ready separation of the liquefied propylene from the alcohol condensate, and the liquid propylene can readily be washed with water in a countercurrent manner to free it from its alcohol content. Where the conditions of temperature and pressure in the condenser and scrubber are such that the propylene is not liquefied, it will be scrubbed in its gaseous state, in much the same manner as highly compressed ethylene.

The present invention is of more or less general application for the condensation and separation of alcohol vapors from olefine gases such as results from the conversion of ethylene or other olefine gas into ethyl alcohol or other alcohol by a continuous catalytic process carried out under a high pressure.

The present process, although it has to do primarily with the treatment of the highly compressed olefine gas and admixed alcohol vapor, modifies and benefits the cyclic process as a whole, so that the cyclic process becomes an improved process, with the recycling of a minimum amount of alcohol vapor, or none at all, in the recycling olefines, and with recovery from the gases leaving the converter of substantially all of the alcohols produced so that little or none of the alcohol is recycled in the further carrying out of the process. The reduction in the loss of olefine gas in solution in the dilute aqueous alcohol as campared with the loss which would take place if the gases were not scrubbed and the alcohol thereby diluted, also benefits the process as a whole as it enables an increased amount of ethylene to be recycled which would otherwise escape from the system in solution in the alcohol.

The invention will be further described in connection with the accompanying diagrammatic drawing or flow sheet which illustrates, in a conventional and schematic manner, an arrangement of apparatus embodying the invention and adapted for the carrying out of the process of the invention. The apparatus, and its operation, will be described in connection with the production and separation of ethyl alcohol, starting with ethylene, although it operates in a similar manner for the production, e. g. of isopropyl alcohol from propylene.

The gaseous ethylene which is to be supplied to the cyclic process enters the system through the pipe 1, controlled by valve 2 and at 3 is mixed with ethylene which has already passed through the cycle. This gaseous mixture is further admixed at 4 with sufficient water for the subsequent hydration, this water being supplied in liquid form through the water pump shown. The admixed ethylene and water pass to the heat interchanger 5, heated by the outgoing hot products from the converter, and the water is vaporized and converted into steam to form a mixture of steam and ethylene in suitable proportions for the catalytic conversion. This mixture of steam and ethylene then passes through the superheater 6, heated by a suitable heating medium such as diphenyl oxide, etc. The mixture then passes through the line 7 into the reaction chamber or converter 8 where it comes into intimate contact with a suitable material or catalysts for promoting the reaction, namely, the combination of ethylene and steam or water vapor to form ethyl alcohol.

The converter 8 is shown conventionally, and different catalytic materials can be used. A dilute inorganic acid catalyst, such as dilute sulfuric acid, is well adapted for use as a catalyst in the process, with provision for heating it to a high temperature e. g. in excess of 200° C., or between 200 and 300° C. The particular catalyst employed, and the particular conditions of temperature and pressure employed, can be varied, since the problem of separating the alcohol vapor from the unconverted alkylene hydrocarbon is much the same with different catalysts, and with different conditions of operation, so long as a high pressure is maintained in the cyclic process.

The alcohol formed in the converter 8, together with substantial quantities of steam and ethylene which have not combined, pass outwardly at a high temperature through the pipe 9 and enter the heat exchanger 5 where they come in thermal countercurrent contact with, and give up a portion of their contained heat to, the incoming fluid, and where cooling and partial condensation of the water and alcohol may take place. From the heat interchanger the admixed ethylene, steam and alcohol, insofar as the water and alcohol have not been condensed in the heat exchanger, pass through the line 10 to a water cooler 15 cooled by ordinary water, for example, to a temperature of around 50° C. From this water cooler, the admixed gases and vapors then pass through the line 16 to the separator 17. The liquid mixture consisting principally of water and alcohol condensed in the water cooler 15, or in both the heat exchanger and water cooler, may collect in the bottom of the separator 17.

The separator 17 is constructed as a scrubber and provision is made for the introduction of a certain amount of liquid water by means of the pump 18, this water entering the top of the scrubber 11. In this scrubber the water flows down over the baffles or trays in a countercurrent manner to the upwardly flowing gases and vapors removing alcohol therefrom in the manner previously described so that dilute aqueous alcohol, e. g. of around 15% strength, collects in the bottom of the scrubber in the separator 17. The uncondensed vapor portion as it leaves the separator 17 and passes upwardly into the lower end of the scrubber 11, at the original high pressure of the cyclic process, contains an appreciable quantity of alcohol in vapor form. This alcohol, in vapor form, which is an appreciable portion of the total alcohol produced in the converter, and which cannot be separated by merely lowering the temperature of the ethylene gas, is thus easily and efficaciously removed by solution in the water by the countercurrent scrubbing operation. The mixture of alcohol and water descends from the scrubber and joins the liquid portion of the entering liquid, entering through the line 16, and the whole collects at the bottom of the separator 17. This liquid portion is drawn off through the valve 19, where its pressure is reduced to atmospheric, and passes through the line 20 to the storage tank 13.

The arrangement of the separator 17 and scrubber 11 is such that liquid aqueous alcohol entering the separator 17 from the line 16 is prevented from escaping upwardly with the uncondensed vapors and gas. The trays in the scrubber 11 may be of the usual type for effecting proper scrubbing of the gas with the liquid. The diluting of the aqueous alcohol in the bottom of the separator by the water which is added in the scrubber gives a more dilute aqueous alcohol than would otherwise be separated, and particularly a more dilute aqueous alcohol than would be separated in the last condenser if the water was not added, thereby minimizing the amount of ethylene dissolved in the aqueous alcohol which is removed from the condenser.

The uncondensed residue leaving the top of the scrubber 11 through the pipe 21 consists substantially of ethylene. This is added to the main cycle as already described by means of the circulating pump 22 and the line 23.

This method of separating the alcohol from the olefines and at the same time conserving practically all of the olefine gas in the high pressure cyclic process so that it can be carried back again to the converter is of particular advantage in that practically all of the alcohol is removed from the olefine before the olefine is returned to the converter, in contrast to prior processes which rely only upon straight condensation where a very considerable proportion of the alcohol formed is retained in vapor form by the olefine gas leaving the condenser and separator and must necessarily be returned to the converter when the olefine gas is returned. The amount of this recycled alcohol present admixed with the olefine gas decreases proportionally the amount of new alcohol which can be formed in the converter; but by the present process, this alcohol, previously unseparated, is separated and withdrawn from the system in the form of dilute alcohol, so that the recycled olefine is substantially alcohol-free.

The separator 17 may be operated at a slightly elevated temperature which will nevertheless permit the alcohols to be removed with substantial completeness from the olefine gas. This can be accomplished moreover with no loss of efficiency of the scrubbing unit. Moreover the amount of olefine gas escaping from the system dissolved in the dilute alcohol is decreased and the efficiency of the whole system is improved.

In cases where volatile impurities, which are miscible with water, are formed, the scrubber serves to remove them from the system along with the aqueous alcohol and thereby allows the olefine to be returned to the converter in a much purer state, freed from constituents which otherwise might be returned to the converter with the olefine, but which are removed from the olefine by the scrubbing treatment.

In the carrying out of the process it is advantageous to subject the outgoing mixture of hydrocarbon, alcohol and water vapor leaving the converter, in which the alcohol is initially formed, to a series of cooling and condensing operations to effect first a preliminary partial liquefaction of water and alcohol before the scrubbing with water to remove the residual alcohol vapors, the whole being carried out under a high pressure. When a preliminary partial condenser is used it is advantageous to regulate the temperature, e. g. at around 50° C. in order to obtain the best balance between the alcohol removed together with water as aqueous alcohol. The removal of the remainder of the alcohol can then be accomplished in the scrubber which may be a tower maintained at the same temperature or at around room temperature with the use of ordinary fresh water introduced at the ordinary temperature of cold water at the top of the scrubber and with the withdrawal of the aqueous alcohol from the bottom of the separator at a similar or somewhat higher temperature.

The pressure maintained during the carrying out of the process can be varied within wide limits. The process presents particular advantage with high pressures, for example, around 500 pounds or 1000 pounds, or even much higher pressures of around 2000 pounds or higher. At such high pressures ethylene, when cooled to a low temperature, has a high density, as above pointed out, but it can nevertheless be effectively freed from the alcohol vapors which would otherwise remain in equilibrium with it, by the practice of the present process.

In the production of isopropyl alcohol from propylene, similar high pressures are advantageously used, although the advantages of the invention are obtained with pressures which are lower. If the pressure is sufficiently high so that, at the temperature to which the propylene gas and admixed isopropyl alcohol vapors are cooled, the propylene may be liquefied, the present process can nevertheless be carried out with countercurrent washing of the liquefied propylene in the scrubber where it remains as a separate liquid from the lower liquid layer of aqueous alcohol. In this case, the liquid propylene will be recycled and will be vaporized on rise in temperature, either before reaching the heat exchanger or in the heat exchanger, so that the propylene will be in gaseous form and will be heated to the necessary temperature before it is returned to the converter.

Where the catalyst employed in the converter chamber is an aqueous catalyst which can furnish the necessary water for the formation of the alcohol from the olefine hydrocarbons, the necessary water can be supplied to the converter instead of admixing water with the olefine before it goes to the converter. In that case sufficient water should be supplied to make up for that escaping admixed with the olefine and alcohol vapors, as well as that which takes part in the chemical reaction of producing the alcohol from the olefine.

In its broader aspects the present invention includes the improved process of separating the alcohol vapors from admixed olefine under a high pressure where an olefine gas substantially free from alcohol is desired, and similar advantages are obtained where the olefine gas is passed to another converter, maintained under a high pressure, as where the olefine gas is recycled to the same converter, or where the cyclic process includes a series of converters, condensers and scrubbers with removal of alcohol from the gases leaving one converter before the remaining gases pass to the next converter of the series.

It will thus be seen that the present invention provides an improved process for the production of alcohols from olefine hydrocarbons in a continuous manner and with continuous condensation and separation and recovery of the alcohol formed from the olefine gases, while carrying out the process, including the condensation and scrubbing, under a high pressure, and with advantages in the condensation and separation step of the process, as well as in the cyclic process as a whole.

The synthetic production of ethyl alcohol from ethylene is described in the applications of Floyd J. Metzger, Serial Nos. 547,452, 578,415 and 726,071; and the production of isopropyl alcohol and higher alcohols from propylene and higher alkylene hydrocarbons is described in the Metzger application Serial No. 705,235. A cyclic process of producing such alcohols from such hydrocarbons with heat interchange of the hot outgoing vapors to effect their cooling and condensation and of the entering hydrocarbons and water to effect vaporization of the water and heating of the resulting mixture of steam and olefine hydrocarbon is described in the Metzger application Serial No. 591,591. The present process can advantageously be carried out with the processes of said prior applications, and as an improvement on said processes, with advantages such as those hereinbefore described.

I claim:

1. In the synthetic production of alcohols from alkylene hydrocarbons by catalytic hydration of the hydrocarbons at a high temperature and under a high pressure and in a continuous manner, and with the continuous formation of a mixture of unchanged hydrocarbon, alcohol vapor and steam, the improvement in the separation and recovery of the alcohols from such mixture which comprises subjecting the admixed alkylene hydrocarbon, alcohol vapor and steam, coming from the high temperature catalytic hydration reaction, while still maintained under a high pressure, to cooling and to a countercurrent scrubbing with water to effect condensation of aqueous alcohol from the mixture and the removal of alcohol vapors from the alkylene hydrocarbon, whereby the alkylene hydrocarbon is recovered in a practically alcohol-free state.

2. The process according to claim 1 in which the hot mixture of alkylene hydrocarbon, alcohol vapor and steam coming from the high temperature catalytic reaction is cooled by heat exchange with the alkylene hydrocarbon before being subjected to further cooling and to the countercurrent scrubbing with water.

3. In the synthetic production of alcohols from alkylene hydrocarbons by catalytic hydration of the hydrocarbons at a high temperature and under a high pressure and in a continuous manner, and with the continuous formation of a mixture of unchanged hydrocarbon, alcohol vapor and steam, the improvement in the separation and recovery of the alcohols from such mixture which comprises subjecting the admixed alkylene hydrocarbon, alcohol vapor and steam, coming from the high temperature catalytic hydration reaction, while still maintained under a high pressure, to cooling to condense aqueous alcohol therefrom and to a subsequent countercurrent scrubbing with water to effect further removal of alcohol vapors from the alkylene hydrocarbon, whereby the alkylene hydrocarbon is recovered in a practically alcohol-free state.

4. The improvement in the catalytic production of alcohols from alkylene hydrocarbons, which comprises passing a mixture of steam and alkylene hydrocarbon in contact with a catalyst at a high temperature and under a high pressure to effect partial conversion of the alkylene hydrocarbon to alcohol and with the resulting production of a mixture containing the unchanged alkylene hydrocarbon, alcohol vapor and water vapor, cooling said mixture to condense aqueous alcohol therefrom, then subjecting the remaining alkylene hydrocarbon and admixed alcohol vapors to scrubbing with water to effect further removal of alcohol therefrom, while still maintained under a high pressure and then returning the alkylene hydrocarbon, from which the alcohol has been thus separated for further use in the process.

5. The process according to claim 4 in which the catalyst employed is a dilute sulfuric acid catalyst maintained at a substantially constant concentration throughout the process.

6. The cyclic method of producing alcohols from alkylene hydrocarbons, which comprises forming a mixture of steam and alkylene hydrocarbon and passing the same in contact with a catalyst at a high temperature and under a high pressure to effect partial conversion of the alkylene hydrocarbon to alcohol and with the resulting production of a mixture containing the unchanged alkylene hydrocarbon, alcohol vapor and water vapor, cooling said mixture to condense aqueous alcohol therefrom, subjecting the remaining alkylene hydrocarbon and admixed alcohol vapor to countercurrent scrubbing with water while still maintained under a high pressure to effect further and substantially complete removal of alcohol therefrom, thereby giving alkylene hydrocarbon practically free from alcohol vapor, recycling such hydrocarbon together with additional alkylene hydrocarbon and with addition of steam therewith and passing the mixture of alkylene hydrocarbon and steam again into contact with the catalyst, and maintaining the alkylene hydrocarbon and admixed vapors under a high and practically constant pressure during the carrying out of the cyclic process.

WALTER WILKINSON.